(12) United States Patent
Marcus et al.

(10) Patent No.: US 9,690,920 B2
(45) Date of Patent: Jun. 27, 2017

(54) SECURE CONFIGURATION CATALOG OF TRUSTED IDENTITY PROVIDERS

(75) Inventors: Jane B. Marcus, Medford, MA (US); Alan D. Eldridge, Hollis, NH (US); David Scott Kern, Jr., Billerica, MA (US); Michael J. Kerrigan, Salem, MA (US); Patrick Charles Mancuso, Center Tuftonboro, NH (US); Robert John Paganetti, Scituate, MA (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/599,348

(22) Filed: Aug. 30, 2012

(65) Prior Publication Data

US 2014/0068743 A1    Mar. 6, 2014

(51) Int. Cl.
G06F 7/04 (2006.01)
G06F 15/16 (2006.01)
G06F 17/30 (2006.01)
H04L 29/06 (2006.01)
G06F 21/33 (2013.01)

(52) U.S. Cl.
CPC .......... *G06F 21/33* (2013.01); *H04L 63/0815* (2013.01); *H04L 63/0884* (2013.01)

(58) Field of Classification Search
CPC ............ H04L 63/0807; H04L 63/0815; H04L 63/104; H04L 9/00; H04L 9/32; G06F 21/00; G06F 21/33
See application file for complete search history.

(56) References Cited

U.S. PATENT DOCUMENTS 8,566,917 B2 * 10/2013 Vangpat .............. H04L 63/0815
  726/8
2004/0128558 A1 * 7/2004 Barrett .................... G06F 21/33
  726/8

(Continued)

OTHER PUBLICATIONS

Goodrich et al., Notarized Federated Identity Management for Web Services, 2006.*

(Continued)

*Primary Examiner* — Eleni Shiferaw
*Assistant Examiner* — Huan V Doan
(74) *Attorney, Agent, or Firm* — David B. Woycechowsky; David H. Judson; Jeffrey S. LaBaw (57) ABSTRACT

A secure database includes a catalog of information about one or more identity providers (IdPs) that are trusted by a service provider (SP) to authenticate users on the SP's behalf. The catalog securely stores one or more IdP configurations. An entry in the database stores information associated with the trusted IdP including artifacts to identify the IdP, artifacts used by the IdP for cryptographic operations, and a specification of one or more website(s) serviced by the trusted identity provider. Upon receipt by the SP of identity information representing a user that has authenticated to an IdP, information in the catalog of information is used to determine whether the IdP is trusted to authenticate the user on the service provider's behalf. The determination verifies that the SP uses the IdP and that a binding between an IdP identifier and at least one IdP cryptographic artifact is valid.

18 Claims, 5 Drawing Sheets

(56) References Cited

U.S. PATENT DOCUMENTS

| | | | | |
|---|---|---|---|---|
| 2005/0074126 A1* | 4/2005 | Stanko | ............... | H04L 63/0807 |
| | | | | 380/279 |
| 2006/0129817 A1* | 6/2006 | Borneman | ............. | G06F 21/41 |
| | | | | 713/170 |
| 2006/0236382 A1* | 10/2006 | Hinton | ............... | H04L 63/0815 |
| | | | | 726/8 |
| 2009/0013391 A1* | 1/2009 | Ernst | .................... | H04L 9/3271 |
| | | | | 726/6 |
| 2009/0300097 A1* | 12/2009 | Meyer | .................. | G06F 17/243 |
| | | | | 709/203 |
| 2009/0320095 A1* | 12/2009 | Nanda | ............... | H04L 63/0807 |
| | | | | 726/2 |

OTHER PUBLICATIONS

Anonymous, "Method for combining OAuth protocol with identity scope to create an Identity Provider providing delegated authentication," IP.com Reference No. IPCOM000198664D, Aug. 11, 2010.
Anonymous, "System and method to assert an identity for SAML Web SSO Post Binding in a J2EE Server," IP.com Reference No. IPCOM000212738D, Nov. 27, 2011.
Staite, "Portable secure identity management for software engineering," ICSE '10, May 2, 2010.

* cited by examiner

| Edit IdP Config | Import XML file | Cancel |
|---|---|---|

IdP Configuration : Renovations

| Basics | Administration |
|---|---|

| Basics | |
|---|---|
| Hostname/IP: | www.renovations.com |
| IdP name: | Renovations |
| Type: | SAML 2.0 |
| State: | Enabled |
| Product: | TFIM |
| Service provider ID: | https://www.renovations.com |
| Artifact resolution service URL: | https://tfim.renovations.com/FIM/sps/samlTAM20/saml20/soap |
| Single sign on service URL: | https://tfim.renovations.com/FIM/sps/samlTAM20/saml20/logininitial |
| Signing X509Certificate (base64): | MIICBzCCAXCgAwIBAgIEQH26vjANBgkqhkiG9w0BAQQFADBIMQswCQYDVQQGEwJVUzE PMA0GA1UEChMGVGI2b2xpMQ4wDAYDVQQLEwVUQU1IQjEYMBYGA1UEAxMPZmItZGV tby5pYm0uY29tMB4XDTA0MDQxNDIyMjcxMFoXDTE UEBhMCVVMxDzANBgNVBAoTBIRpdm9saTEOMAwGA1UECxMFVEFNZUIxGDAWBgNVB AMTD2ZpbWRlbW8uaWJtLPCMTCBnzANBgkqhkiG9w0BAQEFAAOBjQAwgYkCgYEAiZ0D1 X6rk8+ZwNBTVZt7C85m421a8A52Ksjw40t+jNvbLYDp/W66AMMYD7rB5qgniZ5K1p9W8iv 5MaUvN3p4XUCRrfg79OvurvXQ7GZa1/wOp 5vBIdXzg6i9CVAqL29JGi6GYUCAwEAATANBgkqhkiG9w0BAQQFAAOBgQBXiAhxm9l4m+ g3YX+dyGc352TSKO8HvAIBkHHFFwIkzhNg0+zLhxg5UMkOg12X9ucW7IeZ1IB0Z6+JXBr XIWmU3UPum+QxmIaEOOG9zhp9LEfzsE5+ff+7XpS0wpJklY6c+cqHj4aTGfO 26cZNdzxdhikBMZPgdyQ== |
| Encryption X509Certificate (base64): | MIICBzCCAXCgAwIBAgIEQH26vjANBgkqhkiG9w0BAQQFADBI PMA0GA1UEChMGVGI2b2xpMQ4wDAYDVQQLEwVUQU1IQjEYMBYGA1UEAxMPZmItZGV tby5pYm0uY29tMB4XDTA0MDQxNDIyMjcxMFoXDTE3MTIyMjIyMjcxMFowSDELMAkGA1 UEBhMCVVMxDzANBgNVBAoTBIRpdm9saTEOMAwGA1UECxMFVEFNZUIxGDAWBgNV BAMTD2ZpbWRlbW8uaWJtLW    kiG9w0BAQEFAAOBjQAwgYkCgYEAiZ0 D1X6rk8+ZwNBTVZt7C85m421a8A52Ksjw40t+jNvbLYDp/W66AMMYD7rB5qgniZ5K1p9W 8ivM9WbPxc2u/60tFPg0e/Q/r/fxegW1k1umnay+5MaUvN3p4XUCRrfg79OvurvXQ7GZa1/w AATANBgkqhkiG9w0BAQQFAAOBgQBXiAhxm9l4 m+g3YX+dyGc352TSKO8HvAIBkHHFFwIkzhNg0+zLhxg5UMkOg12X9ucW7IeZ1IB0Z6+JX BrXIWmU3UPum+QxmIaEOOG9zhp9LEfzsE5+ff+7XpS0wpJklY6c+cqHj4aTGfOhSE6u7BL dl26cZNdzxdhikBMZPgdyQ== |
| Encryption method: | http://www.w3.org/2001/04/xmlenc#rsa-1_5 |
| Protocol support enumeration: | urn:oasis:names:tc:SAML:2.0:protocol |
| Comment: | |

SECURE CONFIGURATION CATALOG OF TRUSTED IDENTITY PROVIDERS

BACKGROUND OF THE INVENTION

Technical Field

This disclosure relates generally to management of computing resources in a federated environment.

Background of the Related Art

Federated environments are known in the art. A federation is a set of distinct entities, such as enterprises, organizations, institutions, or the like, that cooperate to provide a single-sign-on, ease-of-use experience to a user. A federated environment differs from a typical single-sign-on environment in that two enterprises need not have a direct, pre-established, relationship defining how and what information to transfer about a user. Within a federated environment, entities provide services that deal with authenticating users, accepting authentication assertions (e.g., authentication tokens) that are presented by other entities, and providing some form of translation of the identity of the vouched-for user into one that is understood within the local entity. Federation eases the administrative burden on service providers. A service provider (SP) can rely on its trust relationships with respect to the federation as a whole; the service provider does not need to manage authentication information, such as user password information, because it can rely on authentication accomplished by a user's authentication home domain, which is the domain at which the user authenticates.

In particular, a federated entity may act as a user's home domain that provides identity information and attribute information about federated users. An entity within a federated computing environment that provides identity information, identity or authentication assertions, or identity services, is termed an identity provider (IdP). Other entities or federation partners within the same federation may rely on an identity provider for primary management of a user's authentication credentials, e.g., accepting a single-sign-on token that is provided by the user's identity provider. An identity provider is a specific type of service that provides identity information as a service to other entities within a federated computing environment.

In this type of operating scenario (when the SP application itself does not handle the user authentication), there is a need to secure the application's configuration, namely, the identity of which IdP(s) are allowed to authenticate users on the SP's behalf. Ideally, this configuration should only be available to administrators who are authorized to manage the configuration (including any stored artifacts that may be used to identify the IdP system). If a configuration is not highly-secured, a rogue administrator might wreak havoc, e.g., by altering artifacts for an IdP, or by installing artifacts for a bogus IdP. Also, after an IdP has been discontinued from use, a rogue administrator could cause significant security concerns by resurrecting the configuration for the unapproved IdP.

It is also known to use a login service where SAML (Security Assertion Markup Language) security has been deployed. The SAML security model offloads user authentication to an IdP, which handles the user login. After the IdP has verified the user's identity, the IdP issues to a service provider (SP) application an identity assertion representing the authenticated user. On receipt of the identity assertion, the SP cryptographically verifies the user's assertion, and the SP may allow the user access to resources if the assertion verification is successful. As a prerequisite to verifying assertions, typically the SP is partnered with the IdP and obtains information about the IdP, including the IdP's certificate used with cryptographic operations. In many systems, a service's certificate typically is "public" information that can be widely accessed and, as such, the information may be stored in a directory with wide access permissions. While the IdP's certificate itself is indeed public, it is a disadvantage if there is no clear method for an SP to securely-configure trusted use of the IdP's certificate for validating user identity assertions. Furthermore, an SP may provide service to a variety of websites hosted by the service, and an administrator might require one website to use authentication by a particular IdP while another website requires authentication from an alternate IdP. In the past, there has been no clear method to secure this configuration.

BRIEF SUMMARY

This disclosure describes a method and system to provide a secure database which includes a catalog of information about one or more identity providers (IdPs) that are trusted by a service provider (SP) application to authenticate users on behalf of the application. An identity provider specified in the database is a "trusted identity provider." Preferably, the catalog stores securely and discretely one or more configurations (with each configuration sometimes referred to herein as an IdP "trust document"). Preferably, the database is highly-secured, e.g., using access controls, so that only highly-privileged administrators (or other permitted persons or entities) may access and manage the information stored in the database. Preferably, a trust document entry in the database stores given information associated with the trusted IdP including, without limitation, artifacts to identify the IdP, artifacts used by the IdP for cryptographic operations, enablement and deployment information, and a specification of one or more website(s) serviced by the trusted identity provider.

When a service provider application (SP) needs to redirect a user to a login service, the application accesses the secure database to locate the configuration that corresponds to the website (or, more generally, some protected resource) to which the user is requesting access. Using the database, the application finds the proper redirect URL for the website and redirects the user so that the user can be authenticated at the IdP. During the subsequent SP-IdP interaction, the IdP (via an end user redirect) presents the SP with identity information, e.g., an SAML assertion, representing the user. The SP application then consults the secure configuration again to determine (i) if the application website is authorized to use this IdP to authenticate users, and (ii) if a binding between an IdP name and one or more IdP artifacts is valid for use by the application to cryptographically verify the user's credentials If both conditions are met, the access is permitted.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 illustrates a web-based configurator for creating a trust document; and

DETAILED DESCRIPTION OF AN ILLUSTRATIVE EMBODIMENT

Figure 1:
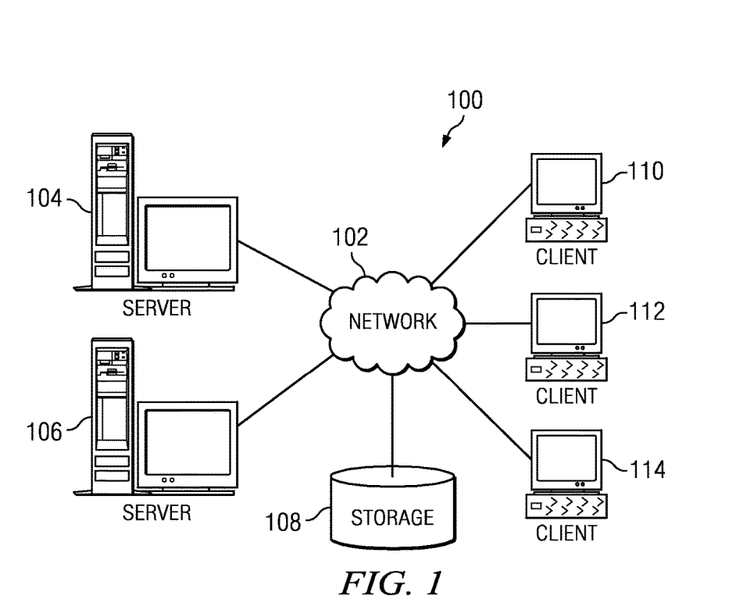
FIG. 1 depicts an exemplary block diagram of a distributed data processing environment in which exemplary aspects of the illustrative embodiments may be implemented.
Figure 2:
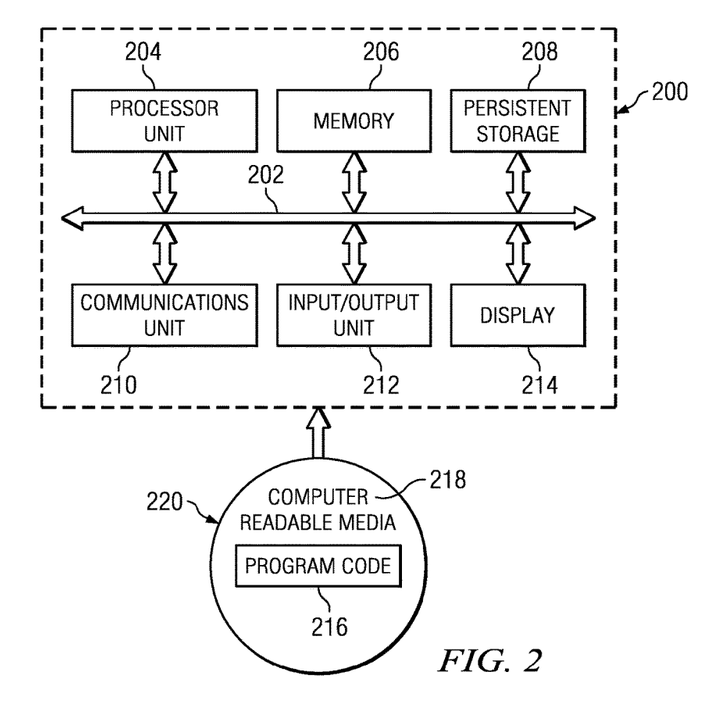
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

The Federation Model

As described above, the techniques described herein find particular utility in the context of a "federated" environment. Thus, the following background is provided. In general, an enterprise has its own user registry and maintains relationships with its own set of users. Each enterprise typically has its own means of authenticating these users. However, in a federated scheme, enterprises cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

As is well-known, a federation is a set of distinct entities, such as enterprises, logical units within an enterprise, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions (e.g., authentication tokens) that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider. A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user. Furthermore, this information can be used by a relying party to provide access to the relying party's resources, based on the relying party's access control rules, identity mapping rules, and possibly some user attributes that are maintained by the relying party.

An identity provider (IdP) is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

Although it may be possible that there could be multiple enterprises within a federated environment that may act as identity providers, e.g., because there may be multiple enterprises that have the ability to generate and validate a user's authentication credentials, etc., a federated transaction usually involves only a single identity provider. If there is only a single federated entity that is able to authenticate a user, e.g., because there is one and only one entity within the federation with which the user has performed a federated enrollment or registration operation, then it would be expected that this entity would act as the user's identity provider in order to support the user's transactions throughout the federated environment.

As additional background, Security Assertion Markup Language (SAML) is an XML-based standard for exchanging authentication and authorization data between security domains, that is, between an identity provider (a producer of assertions) and a service provider (a consumer of assertions). SAML is a development of the OASIS Security Services Technical Committee. SAML implements the concepts of Identity Providers (source of assertions), and Service Providers (consumers of assertions). The Service Provider (SP) trusts the Identity Provider (IdP) to authenticate the principal. SAML assumes the principal (often a user) has enrolled with at least one identity provider. This identity provider is expected to provide local authentication services to the principal. SAML, however, does not specify the implementation of these local services; indeed, SAML does not care how local authentication services are implemented (although individual service providers do). Thus, a service provider relies on the identity provider to identify the principal. At the principal's request, the identity provider passes a SAML assertion to the service provider. On the basis of this assertion, the service provider makes an access control decision. To facilitate SAML, a trusted partnership must be set up that comprises IdPs and SPs exchanging metadata about each other's SAML implementation, including keys to encrypt/decrypt the SAML assertions.

The Cloud Computing Model

By way of additional background, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
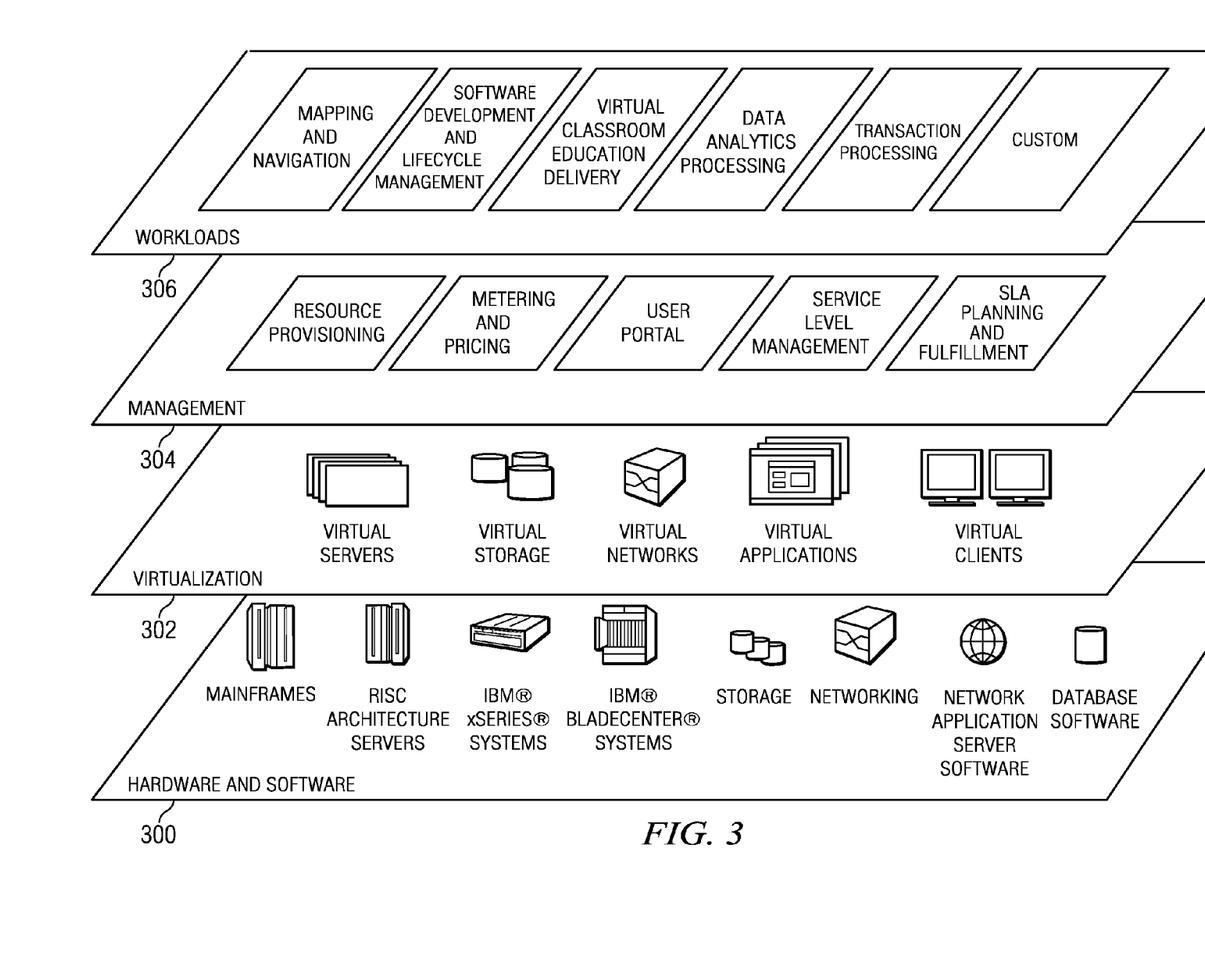
FIG. 3 depicts abstraction model layers of a cloud compute environment in which aspects of this disclosure may be implemented according to an embodiment of the invention.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application 310 that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

A representative cloud-based client-server application is IBM® SmartCloud, which provides a cloud-delivered suite of technologies that combine web conferencing, messaging, and collaboration services with social networking capabilities in an easy-to-use web-based environment. Of course, the references herein to SmartCloud are merely for the sake of illustration, and they are not intended to limit the scope of this disclosure. SmartCloud is based in part on a rich client application known as Lotus Notes®, which provides email, calendaring, contact management, and instant messaging, although rich clients can be implemented in any client-server application. In this example, the server application is IBM Domino® data server.

Service Provider Secure Configuration Catalog of Trusted Identity Providers

With the above as background, the subject matter of this disclosure is now described. As described above, in general this disclosure assumes that a service provider (SP) desires to use an external component (such as an IdP) to authenticate service users. In one embodiment, the service provider is a cloud provider, such as IBM SmartCloud, and the SP has associated therewith one or more SAML-based identity providers. According to this disclosure, a secure database is associated with the SP to hold the configuration about which third party IdPs are trusted by the SP. The database comprises a catalog of trust documents, each of which is associated with a particular IdP configuration. The catalog is accessed and used at two (2) distinct times when a user browses to a protected resource. Initially, the catalog is accessed prior to the user-IdP interaction, and then once again following the user's receipt of the SAML assertion from the IdP.

Figure 4:
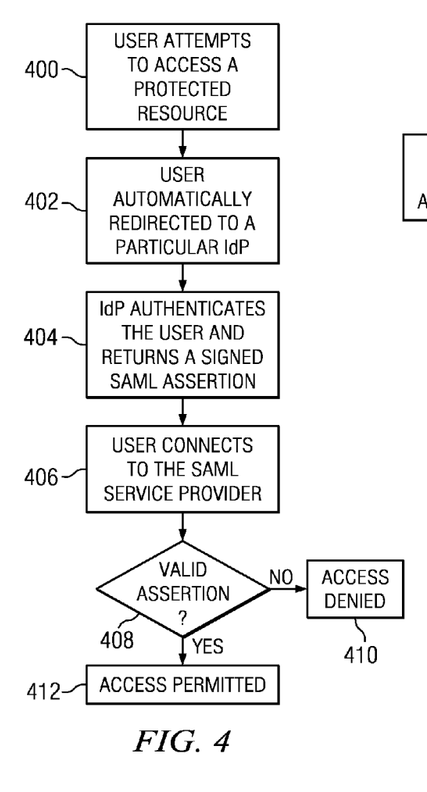
FIG. 4 illustrates how a user interacts with a service provider according to this disclosure.

FIG. 4 is a simplified description of the basic interaction. At step 400, a user attempts to access a protected resource (e.g., a URL hosted on a Domino web server) but is not yet authenticated. At step 402, the user is automatically redirected—according to the configuration in the IdP catalog—to a particular IdP so that the user can acquire a signed SAML assertion for the particular service desired. At step 404, the IdP authenticates the user and returns a signed SAML assertion. The assertion typically includes, without limitation, the public key (or hash of the public key) belonging to the IdP and used to sign the assertion, a name of the IdP, a name of the user, an identifier (typically a URL) of a "service" to be accessed, one or more "not before" or "not after" timestamps, and the like. At step 406, the user connects to the SAML service provider service (e.g., a Domino web server configured as a SAML SP) and presents the assertion. A test is then performed at step 408 to determine if the assertion is valid. If not, access to the resource is denied at step 410. If the assertion is valid, access is permitted at step 412 provided the authenticated user is authorized to access the particular protected resource (e.g., as per the resource's access control list (ACL)). If the authenticated user is not authorized to access the protected resource (not illustrated), access is denied.

Thus, step 402 is the first use of the IdP catalog, and step 408 is the second use of the catalog. More generally, according to this disclosure, a mechanism including the IdP trust catalog provides a way to enable the SAML SP to validate the assertion. (This is step 408 in FIG. 4). In particular, and prior to the operation shown in FIG. 4, information about each external IdP that is trusted by an SP (an "external trusted IdP) is defined in an IdP configuration (or "trust") document. As described above, a set of IdP configuration document(s) are sometimes referred to herein as a "catalog" that is stored in a secure data store that is accessible to the service provider. Access to the database may be over a network, and a connection to the database over that network is secure and subject to one or more access controls, as will be described. Preferably, one or more service providers share a secure data store and the catalog (the IdP configuration documents) stored therein, although a particular SP may have its own secure data store/catalog. In a representative embodiment wherein the service provider is a Domino SAML server, the secure data store catalog may be implemented in Notes Storage Format (NSF), although this is not a limitation. Other types of data stores include, without limitation, relational databases, data arrays, linked lists, and the like.

Figure 5:
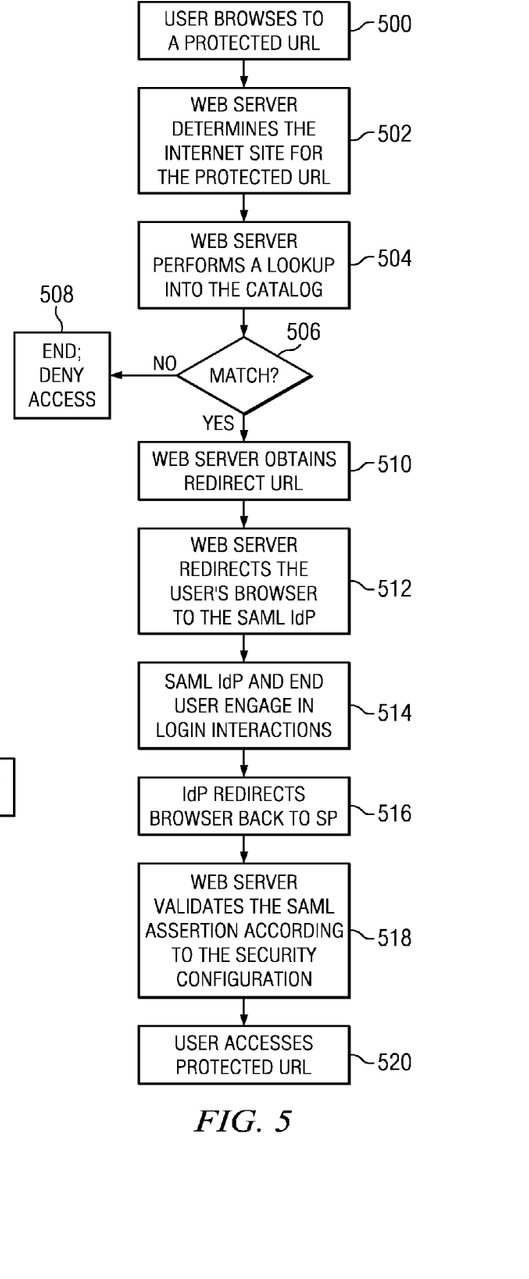
FIG. 5 is another example scenario what happens when a user is authenticated via SAML at a SP web server according to this disclosure.

FIG. 5 is a more detailed process flow illustrating a view of interactions with the catalog when a user is authenticated via SAML at a web server (such as a Domino server). At step 500, and using a web browser, the user browses to a protected URL. The user then authenticates to the SAML SP using the following sub-steps. At step 502, the web server determines the Internet site for the protected URL and, at step 504, performs a lookup into the catalog for a matching entry for this site. At step 506, a test is performed to determine if a match exists in the catalog. If step 506 does not return a match, the routine branches to step 508 and ends. If, however, a match is found, the routine continues a step 510 with the web server obtaining (from the catalog entry) information about the SAML IdP's redirect URL. At step 512, the web server redirects the user's browser to the SAML IdP according to the configuration in the catalog. At step 514, the SAML IdP and the end user engage in steps to login the user in the usual manner. The end result is that the IdP authenticates the end user and provides the user's SAML assertion intended for the web server (assuming that the user authentication was successful). At step 516, the SAML IdP redirects the user's browser back to the web server. Then, at step 518, the web server validates the SAML assertion according to the security configuration in the catalog for the Internet site (e.g., using the stored IdP signing certificate during the verification) so that the user is authenticated to the web server. At step 520, and assuming the validations return positive, the user accesses the protected URL at the Internet site.

Thus, step 518 determines (based on the IdP configuration document): (i) if the application website is authorized to use this IdP to authenticate users, and (ii) if a binding between an IdP name and one or more IdP artifacts is valid for use by the application to cryptographically verify the user's credentials If both conditions are met, the access is permitted. In this manner, a trust model between the SP and its trusted IdPs is enforced.

According to this disclosure, a secure database holds configuration data about externally-trusted IdPs. While the information about an IdP's certificates and URLs is typically public, how the SP uses that IdP (the SP configuration) needs to remain protected and secure. The database comprising the IdP catalog provides this security. Participating SPs (typically one or more SAML-based servers) have access to the database, preferably over a secure link. The database may also be protected by a restricted access control list (ACL) so its contents cannot be tampered with. Entries in the database are established during a setup operation by the SP. In particular, a security administrator may create the catalog on a SAML server and then optionally replicate the database as needed.

Figure 6:
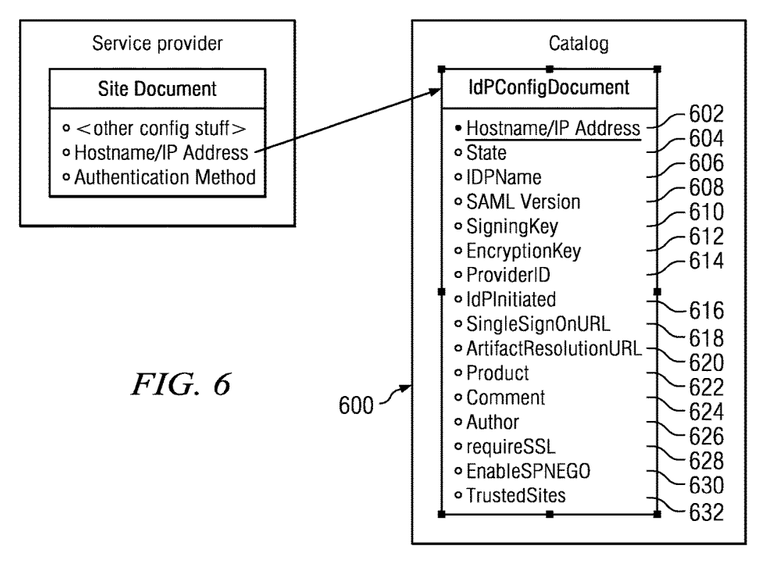
FIG. 6 illustrates a representative trust document for an IdP.

The following provides additional details regarding the trust model that is implemented by the above-described scheme to enable the SP to validate the assertion. As noted above, the data store maintains IdP trust documents or entries, each of which can be accessed and consulted by a SP to determine whether the SP can use the particular IdP and whether a binding between an IdP name and IDP cryptographic data is valid. FIG. 6 illustrates a representative trust document 600 that includes the following fields: Hostname/IP Address 602 (which may be a multi-valued list) identifying the name(s) and/or IP addresses of the website to which this document applies, State 604, which may be "Enabled" if the document is active, IdPName 606, the name of the identity provider, SAML Version 608, a version of SAML supported by the IdP, Signing certificate 610, Encryption certificate 612, Provider ID 614, IdPInitiated 616, a Boolean value that indicates whether the authentication process is initiated by the IdP or the SP, Single sign-on service URL 618, Artifact resolution service URL 620, Product identifier 622, Comments 624, and Author 626. Further, to support the functionality described above from participating clients (for example, IBM SmartCloud, which interacts with the IdP), the trust document also includes a requireSSL field 628, an enable SPNEGO/Kerberos field 630, and a multi-valued list field 632 identifying TrustedSites. In particular, the Notes client will require the redirect to the IdP to be done over SSL if requireSSL is configured. The Notes client monitors the redirection of the Notes user to the IdP URLs. If the IDP uses multiple URLs during the user authentication, the Notes client requires that these IdP URLs are at sites configured in the TrustedSites list. Further, the Notes client will participate in the SPNEGO/Kerberos user authentication managed by the IdP, if allowed for in the configuration.

Although the information may be input in any manner (and may include data obtained from various sources that are available to the service provider), FIG. 7 illustrates a web-based configurator for enabling a permitted SP administrative user to configure a trust document. In FIG. 7, some of the base64 encodings are shown redacted. In practice, some information that is imported into the database (i.e., into a trust document) is imported from XML or other files that are exported from the IdP; other information (e.g., the State) is specific to the deployment. While the above data fields show possible data items that comprise the trust document, any piece of data about an IdP or deployment information related to the service provider's use of the IdP may be kept in the secure database.

Preferably, write access to the trust document is highly-restricted using one or more access controls, although read access may be more widely permitted. Preferably, the configuration catalog is very tightly-controlled so that it can be modified only by highly-privileged administrators. This is a significant deterrent to a rogue administrator. Also, preferably the secure database can be set to be readable only by the application and by the application administrators to discourage security attacks from insiders or the general public.

The configuration catalog may be used in a distributed model wherein the database is replicated across multiple SP hosts. With respect to SP applications having a need to access the catalog, the catalog is highly-available, scalable and reliable. The data comprising the secure configuration catalog may be managed centrally or in a distributed manner.

The particular deployment scenario is not a limitation of this disclosure. The techniques described herein may be used in any deployment scenario (including, without limitation, for providing mobile access to web and other social network-based resources).

Figure 8:
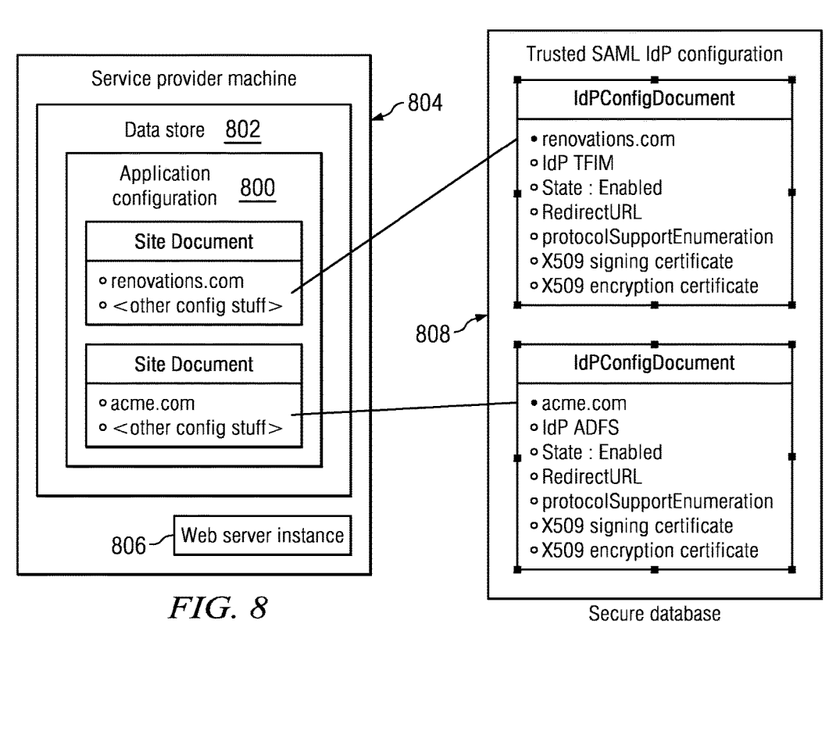
FIG. 8 illustrates another example scenario illustrating how the trust document catalog is used according to this disclosure.

Upon start-up of the SP, the catalog information is loaded into memory of a machine executing the above-described mechanism, and the catalog is accessed as required by the SP to obtain the information required, both before and during the SAML assertion check. FIG. 8 illustrates another example scenario wherein the SP application configuration is hosting two (2) (fictitious) websites: renovations.com and acme.com. The SP application configuration 800 is hosted in a data store 802 associated with a machine 804. The machine executes a service provider, such as a Domino web server 806 providing access to protected resource(s) associated with those sites (or the sites themselves may be the protected resource(s)). As indicated by the catalog 808 stored in the secure data store, the renovations.com website is configured to use IDP TFIM (IBM Tivoli Federated Identity Manager), whereas the acme.com website is configured to use the IdP ADFS (Microsoft® Active Directory). As has been described, the application reads the secure database to find the information that pertains to a particular website. The secure database includes the information associated with the trusted IdP, including the signing certificate that is needed to verify a SAML assertion by the application SP.

As mentioned above, this disclosure describes a method and system to provide a secure database which includes information providing a catalog of identity providers (IdPs) that are trusted by a service provider (SP) application to authenticate users on behalf of the application. An identity provider specified in the database is a "trusted identity provider." Preferably, the catalog is a distinct and secure configuration stored in the database, which is highly-secured using access control, so that only highly-privileged administrators (or other permitted persons or entities) may access and manage the information stored in the database. Preferably, an entry in the database stores given information associated with the trusted IdP including artifacts to identify the IdP, artifacts used by the IdP for cryptographic operations, enablement and deployment information, and a specification of one or more website(s) serviced by the trusted identity provider.

When a service provider application (SP) needs to redirect a user to a login service, the application accesses the secure database to locate the configuration that corresponds to the website to which the user is requested access. Using the database, the application finds the proper redirect URL for the website and redirects the user so that the user can be authenticated at the IdP. During the SP-IdP interaction, the IdP presents the SP with identity information, e.g., an SAML assertion, representing the user. The SP application then consults the secure configuration again to determine (i) if the application website is authorized to use this IdP to authenticate users, and (ii) if a binding between an IdP name and one or more IdP artifacts is valid for use by the application to cryptographically verify the user's credentials. If both conditions are met, the access is permitted.

The above-described technique provides numerous advantages, as have been described. The IdP catalog secures the configuration data, and it protects against tampering by malicious end users or rogue administrators. By making the database accessible only to a limited number of administrators and to the participating SPs, a secure yet highly available and reliable mechanism is provided to enable a SAML SP to validate assertions. The SAML authentication feature in general benefits both administrators and end users by facilitating SSO and thereby providing administrative cost savings The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As has been described, the scheme described herein may be implemented in or in conjunction with various server-side architectures other than cloud-based infrastructures. These include, without limitation, simple n-tier architectures, web portals, federated systems, and the like.

As the above examples illustrate, one or more of the service providers, the SAML assertion signature validation operation, and the catalog itself may be hosted within or external to the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data can be configured into a data structure (e.g., an array, a linked list, etc.) and stored in a data store, such as computer memory. Furthermore, as noted above, the functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the service provider components are implemented in a special purpose computer, preferably in software executed by one or more processors. The associated catalog configuration is stored in an associated data store. The software also is maintained in one or more data stores or memories associated with the one or more processors, and the software may be implemented as one or more computer programs.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Firefox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

As used herein, a "service provider" or an "identity provider" may be a fully-featured or partially-featured provider.

Of course, the identification of any commercial product herein is not meant to be taken to limit the disclosed subject matter.

Having described our invention, what we now claim is as follows.

The invention claimed is:

1. A method for enabling access to a protected resource by a client, comprising:
   in association with a service provider, storing a private catalog of information about one or more identity providers that are trusted by a service provider, the private catalog of information comprising, for each identity provider, a trust document that comprises private configuration data describing how the service provider uses the identity provider, a specification of one or more websites serviced by the identity provider, and one or more cryptographic artifacts used by the identity provider for cryptographic operations, wherein the identity provider cryptographic artifact is a digital certificate associated with the identity provider, the private configuration data being inaccessible by the client while being stored, the service provider executing on a data processing machine having a hardware element;
   responsive to receipt of a request to access the protected resource by the client, the service provider using the private configuration data to redirect the client to an identity provider;
   while the request to access the protected resource by the client remains pending, the service provider receiving identity information representing a user that has authenticated to the identity provider to which the client was redirected based on the private configuration data;
   while the request to access the protected resource by the client remains pending, the service provider determining whether the identity provider is trusted to authenticate the user on the service provider's behalf by evaluating the private configuration data in the trust document, wherein evaluating the private configuration data includes determining, based on the specification, whether a website associated with the service provider is authorized to use the identity provider to authenticate users, and determining, based on the one or more cryptographic artifacts, whether a binding between an identity provider identifier and at least one identity provider cryptographic artifact is valid for use by the service provider to cryptographically verify the identity information representing the user; and
   if the identity provider is trusted based on the determining operations, and as a response to the request to access, permitting the client to access the protected resource.

2. The method as described in claim 1 wherein the identity information is a SAML assertion.

3. The method as described in claim 1 further including restricting write access to the private catalog of information.

4. The method as described in claim 1 wherein the private catalog of information comprises a discrete and secure configuration trust document associated with each identity provider.

5. The method as described in claim 1 wherein the method further comprises:
   receiving the request from the client to access the protected resource;
   using information in the private catalog of information to locate a configuration that corresponds to a website associated with the protected resource; and
   redirecting to the website to enable the user to be authenticated at the identity provider.

6. The method as described in claim 1 wherein the trust document for a given identity provider also includes an identity of one or more websites that are authorized to use the identity provider.

7. Apparatus, comprising:
   a processor;
   computer memory holding computer program instructions that when executed by the processor perform a method for enabling access to a protected resource by a client, the method comprising:
      in association with a service provider, storing a private catalog of information about one or more identity providers that are trusted by a service provider, the private catalog of information comprising, for each identity provider, a trust document that comprises private configuration data describing how the service provider uses the identity provider, a specification of one or more websites serviced by the identity provider, and one or more cryptographic artifacts used by the identity provider for cryptographic operations, wherein the identity provider cryptographic artifact is a digital certificate associated with the identity provider, the private configuration data being inaccessible by the client while being stored, the service provider executing on a data processing machine having a hardware element;
      responsive to receipt of a request to access the protected resource by the client, the service provider using the private configuration data to redirect the client to an identity provider;
      while the request to access the protected resource by the client remains pending, the service provider receiving identity information representing a user that has authenticated to the identity provider to which the client was redirected based on the private configuration data;
      while the request to access the protected resource by the client remains pending, the service provider determining whether the identity provider is trusted to authenticate the user on the service provider's behalf by evaluating the private configuration data in the trust document, wherein evaluating the private configuration data includes determining, based on the specification, whether a website associated with the service provider is authorized to use the identity provider to authenticate users, and determining, based on the one or more cryptographic artifacts, whether a binding between an identity provider identifier and at least one identity provider cryptographic artifact is valid for use by the service provider to cryptographically verify the identity information representing the user; and if the identity provider is trusted based on the determining operations, and as a response to the request to access, permitting the client to access the protected resource.

8. The apparatus as described in claim 7 wherein the identity information is a SAML assertion.

9. The apparatus as described in claim 7 wherein the method further includes restricting write access to the private catalog of information.

10. The apparatus as described in claim 7 wherein the private catalog of information comprises a discrete and secure configuration trust document associated with each identity provider.

11. The apparatus as described in claim 7 wherein the method further comprises:
   receiving the request from the client to access the protected resource;
   using information in the private catalog of information to locate a configuration that corresponds to a website associated with the protected resource; and
   redirecting to the website to enable the user to be authenticated at the identity provider.

12. The apparatus as described in claim 7 wherein the trust document for a given identity provider also includes an identity of one or more websites that are authorized to use the identity provider.

13. A computer program product in a non-transitory computer readable medium for use in a data processing system for providing identity provider services using an identity provider instance discovery service, the computer program product holding computer program instructions which, when executed by the data processing system, perform a method for enabling access to a protected resource by a client, the method comprising:
   in association with a service provider, storing a private catalog of information about one or more identity providers that are trusted by a service provider, the private catalog of information comprising, for each identity provider, a trust document that comprises private configuration data describing how the service provider uses the identity provider, a specification of one or more websites serviced by the identity provider, and one or more cryptographic artifacts used by the identity provider for cryptographic operations, wherein the identity provider cryptographic artifact is a digital certificate associated with the identity provider, the private configuration data being inaccessible by the client while being stored, the service provider executing on a data processing machine having a hardware element;
   responsive to receipt of a request to access the protected resource by the client, the service provider using the private configuration data to redirect the client to an identity provider;
   while the request to access the protected resource by the client remains pending, the service provider receiving identity information representing a user that has authenticated to the identity provider to which the client was redirected based on the private configuration data;
   while the request to access the protected resource by the client remains pending, the service provider determining whether the identity provider is trusted to authenticate the user on the service provider's behalf by evaluating the private configuration data in the trust document, wherein evaluating the private configuration data includes determining, based on the specification, whether a website associated with the service provider is authorized to use the identity provider to authenticate users, and determining, based on the one or more cryptographic artifacts, whether a binding between an identity provider identifier and at least one identity provider cryptographic artifact is valid for use by the service provider to cryptographically verify the identity information representing the user; and
   if the identity provider is trusted based on the determining operations, and as a response to the request to access, permitting the client to access the protected resource.

14. The computer program product as described in claim 13 wherein the identity information is a SAML assertion.

15. The computer program product as described in claim 13 wherein the method further includes restricting write access to the private catalog of information.

16. The computer program product as described in claim 13 wherein the private catalog of information comprises a discrete and secure configuration trust document associated with each identity provider.

17. The computer program product as described in claim 13 wherein the method further comprises:
   receiving the request from the client to access the protected resource;
   using information in the private catalog of information to locate a configuration that corresponds to a website associated with the protected resource; and
   redirecting to the website to enable the user to be authenticated at the identity provider.

18. The computer program product as described in claim 13 wherein the trust document for a given identity provider also includes an identity of one or more websites that are authorized to use the identity provider.

* * * * *

UNITED STATES PATENT AND TRADEMARK OFFICE
CERTIFICATE OF CORRECTION

PATENT NO. : 9,690,920 B2  
APPLICATION NO. : 13/599348  
DATED : June 27, 2017  
INVENTOR(S) : Jane B. Marcus et al.

Page 1 of 1

It is certified that error appears in the above-identified patent and that said Letters Patent is hereby corrected as shown below:

On the Title Page

Item (75): Inventors: should read as follows:  
... Jane B. Marcus, Medford, MA (US);  
Alan D. Eldridge, Hollis, NH (US);  
David Scott Kern, Billerica, MA (US);  
Michael J. Kerrigan, Salem, MA (US);  
Patrick Charles Mancuso, Center Tuftonboro, NH (US);  
Robert John Paganetti, Scituate, MA (US) ...

Signed and Sealed this  
Twenty-first Day of April, 2020

Andrei Iancu  
*Director of the United States Patent and Trademark Office*